United States Patent
Pawar et al.

(10) Patent No.: US 11,863,497 B2
(45) Date of Patent: *Jan. 2, 2024

(54) REDUCTION OF TTI BUNDLING IN VIEW OF PROACTIVE IMPOSITION OF AIR-INTERFACE RESOURCE RESERVATION FOR A DEVICE CLASS

(71) Applicant: Sprint Spectrum L.P., Overland Park, KS (US)

(72) Inventors: Hemanth B. Pawar, Brambleton, VA (US); Krishna Sitaram, Chantilly, VA (US); Shilpa K. Srinivas, Brambleton, VA (US)

(73) Assignee: Sprint Spectrum LLC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/663,145

(22) Filed: May 12, 2022

(65) Prior Publication Data
US 2022/0271901 A1     Aug. 25, 2022

Related U.S. Application Data

(63) Continuation of application No. 16/913,155, filed on Jun. 26, 2020, now Pat. No. 11,362,795.

(51) Int. Cl.
*H04L 5/00* (2006.01)
*H04W 28/26* (2009.01)
(Continued)

(52) U.S. Cl.
CPC .......... *H04L 5/0082* (2013.01); *H04W 28/26* (2013.01); *H04W 72/0453* (2013.01); *H04W 92/10* (2013.01)

(58) Field of Classification Search
None
See application file for complete search history.

(56) References Cited

U.S. PATENT DOCUMENTS 9,357,546 B1  5/2016  Marupaduga et al.
9,986,556 B1  5/2018  Zhou et al.
(Continued)

FOREIGN PATENT DOCUMENTS

EP          2820906         4/2016

OTHER PUBLICATIONS

International Search Report and Written Opinion from International Application No. PCT/US21/37236, dated Sep. 23, 2021.
(Continued)

*Primary Examiner* — Saba Tsegaye
(74) *Attorney, Agent, or Firm* — Lee & Hayes, P.C.

(57) ABSTRACT

A method and system for controlling application of TTI bundling on a carrier on which an access node provides service, the carrier defining air-interface resources. An example method includes detecting that at least a predefined threshold number of devices of a predefined class (e.g., IoT devices) are connected with the access node on the carrier. Further, the example method includes, responsive to the detecting that at least the predefined threshold number of devices of the predefined class are connected with the access node on the carrier, proactively reserving a portion of the air-interface resources for use to serve communications between the access node and the devices of the predefined class and, in view of the proactive reserving of the portion of the air-interface resources, imposing a reduction in the application of the TTI bundling by the access node on the carrier.

20 Claims, 4 Drawing Sheets

(51) Int. Cl.
*H04W 72/04* (2023.01)
*H04W 92/10* (2009.01)
*H04W 72/0453* (2023.01)

(56) References Cited

U.S. PATENT DOCUMENTS

| | | |
|---|---|---|
| 10,123,311 B1 | 11/2018 | Srinivas et al. |
| 10,149,193 B2 | 12/2018 | Cui et al. |
| 10,524,257 B2 | 12/2019 | Li et al. |
| 11,388,721 B1 * | 7/2022 | Marupaduga ............ H04W 4/16 |
| 2012/0020309 A1 * | 1/2012 | Malladi .............. H04W 72/0446 |
| | | 370/329 |
| 2012/0176993 A1 | 7/2012 | Wang |
| 2015/0334733 A1 | 11/2015 | Ren et al. |
| 2016/0323889 A1 | 11/2016 | Jeon et al. |
| 2017/0041922 A1 | 2/2017 | Chen et al. |
| 2018/0027562 A1 | 1/2018 | Jeon et al. |
| 2019/0246359 A1 | 8/2019 | Yoon |
| 2019/0280845 A1 | 9/2019 | Bedekar |

OTHER PUBLICATIONS

U.S. Appl. No. 16/257,448, filed Jan. 25, 2019.

\* cited by examiner

REDUCTION OF TTI BUNDLING IN VIEW OF PROACTIVE IMPOSITION OF AIR-INTERFACE RESOURCE RESERVATION FOR A DEVICE CLASS

REFERENCE TO RELATED APPLICATION

This is a continuation of U.S. patent application Ser. No. 16/913,155, filed Jun. 26, 2020, now issued as U.S. Pat. No. 11,362,795, the entirety of which is hereby incorporated by reference.

BACKGROUND

A cellular wireless network typically includes a number of access nodes that are configured to provide wireless coverage areas, such as cells and cell sectors, in which user equipment devices (UEs) such as cell phones, tablet computers, machine-type-communication devices, tracking devices, embedded wireless modules, and/or other wirelessly equipped communication devices (whether or not user operated), can operate. Each access node could be coupled with a core network that provides connectivity with various application servers and/or transport networks, such as the public switched telephone network (PSTN) and/or the Internet for instance. With this arrangement, a UE within coverage of the cellular network could engage in air interface communication with an access node and could thereby communicate via the access node with various application servers and other entities.

Such a network could operate in accordance with a particular radio access technology (RAT), with communications from the access nodes to UEs defining a downlink or forward link and communications from the UEs to the access nodes defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which can facilitate mobile broadband service using technologies such as orthogonal frequency division multiplexing (OFDM) and multiple input multiple output (MIMO). And recently, the industry has been exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could provide coverage on one or more radio frequency (RF) carriers, each of which could be frequency division duplex (FDD), defining separate frequency channels for downlink and uplink communication, or time division duplex (TDD), with a single frequency channel multiplexed over time between downlink and uplink use. Each such frequency channel could be defined as a specific range of frequency having a bandwidth and a center frequency and thus extending from a low-end frequency to a high-end frequency.

Further, on the downlink and uplink, the air interface on each carrier could be configured in a specific manner to define physical resources for carrying information (e.g., user-plane data and control-plane signaling) wirelessly between the access node and UEs.

In a non-limiting example implementation, for instance, the air interface on each carrier could be divided over time into frames, subframes, and symbol time segments, and over frequency into subcarriers that could be modulated to carry data. The example air interface could thus define an array of time-frequency resource elements, with each resource element spanning a respective symbol time segment and occupying a respective subcarrier, and the subcarrier of each resource element could be modulated to carry information. Further, each subframe could function as a transmission time interval (TTI), and the resource elements in each TTI on the downlink and uplink of the example air interface could be grouped to define physical resource blocks (PRBs) that could be allocated as needed to carry data between the access node and served UEs.

In addition, certain resource elements on the example air interface could be designated for special use. For instance, on the downlink, certain resource elements could be set aside to define a downlink control region for carrying control signaling from the access node to UEs, certain resource elements could be designated to carry broadcast synchronization signals that UEs could detect as an indication of coverage on the carrier and to establish frame timing, and certain resource elements could be designated to carry a reference signal that UEs could measure to determine coverage strength, among other possibilities. And on the uplink, certain resource elements could be set aside to define an uplink control region for carrying control signaling from UEs to the access node, and certain resource elements could be designated to carry uplink reference signals or the like that could be used to evaluate uplink channel conditions, among other possibilities.

OVERVIEW

When a UE enters into coverage of an example network, the UE could detect threshold strong coverage of an access node on a particular carrier (e.g., a threshold strong reference signal broadcast by the access node on that carrier) and could then engage in random-access and connection signaling, such as Radio Resource Control (RRC) signaling, with the access node to establish an RRC connection or the like through which the access node will then serve the UE on the carrier. Further, if the UE is not already registered for service with the core network, the UE could transmit to the access node an attach request, which the access node could forward to a core-network controller for processing. And the core-network controller could then coordinate setup for the UE of one or more user-plane bearers extending between the UE and a core-network gateway that provides transport-network connectivity.

Once the UE is so connected and registered, the access node could then serve the UE in an RRC-connected mode on the carrier, managing downlink air-interface communication of packet data to the UE and uplink air-interface communication of packet data from the UE.

For instance, when the core-network gateway receives user-plane data for transmission to the UE, the data could flow to the access node, and the access node could buffer the data, pending transmission of the data to the UE. With the example air-interface configuration noted above, the access node could then allocate downlink PRBs in an upcoming TTI for carrying at least a portion of the data, defining a transport block, to the UE. And the access node could then transmit to the UE in the downlink control channel of that TTI a Downlink Control Information (DCI) message that designates the allocated PRBs, and the access node could accordingly transmit the transport block to the UE in those designated PRBs.

Likewise, on the uplink, when the UE has user-plane data for transmission on the transport network, the UE could buffer the data, pending transmission of the data to the access node, and the UE could transmit to the access node a scheduling request that carries a buffer status report (BSR) indicating the quantity of data that the UE has buffered for transmission. With the example air-interface configuration noted above, the access node could then allocate uplink PRBs in an upcoming TTI to carry a transport block of the data from the UE and could transmit to the UE, in the downlink channel of a preceding TTI, a DCI message that designates those upcoming PRBs. And the UE could then accordingly transmit the transport block to the access node in the designated PRBs.

This process could be used to facilitate various types of communication by various types of UEs. For example, the process could enable wirelessly-equipped smart phones and other computing devices to engage in general Internet communications as well as packet-based real-time media communications such as voice over Internet Protocol (VoIP) communication, streaming video communication, and gaming, among other possibilities. Further, the process could enable communication by IoT devices such as Cat-M1, narrowband IoT (NB-IoT), or other low power (e.g., low power wide area network (LPWAN)) machine-type-communication (MTC) (e.g., enhanced MTC (eMTC)) and/or machine-to-machine (M2M) devices, among other possibilities.

In a representative system, to help ensure successful air-interface transmission between the access node and a served UE (on the downlink and/or uplink), the access node and UE could be configured to apply an automatic retransmission process, such as a Hybrid Automatic Repeat Request (HARD) process.

With HARQ, after a transmitting entity has transmitted a block of data to a receiving entity, possibly together with forward-error-correction coding, the transmitting entity waits to receive a HARQ response from the receiving entity, based on the receiving entity's evaluation of whether the data arrived successfully (e.g., based on a cyclic redundancy check (CRC)). If the transmitting entity receives a positive acknowledgement (ACK) as the HARQ response, then no re-transmission is needed and the transmitting entity can proceed to transmit additional data. Whereas, if the transmitting entity receives a negative acknowledgement (NACK) as the HARQ response, then the transmitting entity re-transmits the data, possibly with different error-correction coding. Further, the transmitting entity may also re-transmit the data if the transmitting entity does not receive any HARQ response within a certain period of time.

This re-transmission approach can allow data to be successfully decoded by the receiving entity even when there is a substantial probability that the transmitted data would be received with one or more errors, for example, because of poor radio frequency (RF) conditions. Specifically, the data can be re-transmitted multiple times (e.g., up to a set re-transmission limit), possibly with varying error-correction coding, until the receiving entity can decode the data without errors.

This re-transmission approach, however, also increases latency. For example, for each re-transmission, there can be a period of delay between when the transmitting entity transmits data and when the transmitting data receives a NACK response from the receiving entity, and there can be another period of delay between when the transmitting entity receives the NACK response and when the transmitting entity then re-transmits the data. This latency issue could be especially troubling for latency-sensitive communications, such as VoIP communication or other packet-based real-time media communications.

In order to reduce the delay associated with re-transmitting data, the representative system could also be configured to support a bundling option for data transmissions. For instance, while scheduled transmission of a transport block may normally occur in just one TTI and the transmitting entity may then wait to receive a HARQ response before re-transmitting the transport block or proceeding to transmit another transport block, the system could allow for TTI bundling.

With TTI bundling, the transmitting entity would automatically transmit a block of data repeatedly in multiple (e.g., consecutive) TTIs defining a TTI bundle, and the receiving entity would then provide a HARQ responsive for that set of transmissions cooperatively rather than providing a separate HARQ response after each transmission. After the transmitting entity provides the transmissions repeatedly in the multiple TTIs, the transmitting entity would then wait to receive a HARQ response for that group of transmissions as a whole—i.e., a HARQ response indicating whether or not the receiving entity successfully received the block of data.

This TTI bundling process could allow for more robust reception of data, without the delay that would be associated with the transmitting entity transmitting the data multiple times and waiting for a HARQ response respectively after each transmission.

Unfortunately, however, communication using TTI bundling necessarily also consumes a number of PRBs or other such resources on the access node's air interface that might not otherwise be consumed without use of TTI bundling. For instance, if transmission of a block of data would normally occur in six PRBs of a TTI, and if TTI bundling would involve automatically engaging in that transmission four times, then communicating that block of data using TTI bundling would necessarily consume twenty-four PRBs—even if the first, second, or third of those transmissions is successful.

Normally, this extra consumption of air-interface resources may be tolerable, as a trade-off for helping to reduce latency.

However, another technical problem that can arise in an example system is that the access node may sometimes operate with a set of its PRBs proactively reserved for use to carry communications for a particular class of UEs. That proactive resource reservation could further limit PRB availability on the air-interface and, when combined with use of TTI bundling, could be troubling.

For instance, to help ensure that air-interface capacity exists to serve IoT devices (e.g., eMTC, NB-IoT, and/or Cat-M1 devices), the access node might be configured to detect when at least a predefined threshold number of IoT devices are RRC connected with the access node on a given carrier and, in response, to proactively reserve a set of PRBs on that carrier for use to carry air-interface communications with those IoT devices. This PRB reservation would be proactive, in anticipation of a likely future need to schedule air-interface communications to/from the connected IoT devices, and is therefore distinct from reactively reserving PRBs to carry data that is currently waiting to be transmitted.

An example such PRB-reservation could be a reservation of one or more specifically designated PRBs on a per-TTI basis or the like, such as a group of PRBs (contiguous or non-contiguous) at the same designated frequency position(s) respectively in each TTI or one or more designated TTIs per frame. Or the reservation could be with respect to certain percentage or number of such PRBs per unit time even if not at the same frequency position per TTI. Other examples are possible as well.

Once the access node proactively imposes this example resource reservation in response to at least the predefined threshold number of IoT devices being connected with the access node on the carrier, resource availability on that carrier would necessarily become more limited. Especially at times of heavy usage, this reduced resource-availability could then pose an issue for timely scheduling of latency-sensitive communications or other communications on the carrier.

The present disclosure provides a mechanism to help address this issue. In accordance with the disclosure, once the access node proactively imposes an air-interface resource reservation on a carrier, for instance in response to at least a predefined threshold number of UEs of a given class being connected with the access node on the carrier, the access node will then reconfigure itself to reduce the extent of TTI bundling that the access node applies on the carrier, with the reconfiguration heling to mitigate the reduced resource-availability on the carrier.

In an example implementation, for instance, the access node might normally be configured to schedule use of TTI bundling on the carrier for VoIP communication as noted above (e.g., to schedule use of TTI bundling for a communication in response to the communication being VoIP communication). But in response to the access node proactively imposing an air-interface resource reservation on the carrier due to at least a predefined threshold number of UEs of a given class being connected with the access node on the carrier, the access node could dynamically reconfigure itself to not schedule use of TTI bundling on the carrier for VoIP communication (e.g., to not schedule use of TTI bundling for a communication even though the communication is VoIP communication). Further, the access node could maintain this revised configuration temporarily, such as until the number of connected UEs of the given class devices drops to below the threshold for instance, and the access node could then revert to its default configuration.

Alternatively, in another example implementation, the access node might normally be configured to schedule use of TTI bundling on the carrier with use of a particular TTI bundling factor defining the quantity of transmissions in each bundle. And in response to the access node proactively imposing the air-interface resource reservation on the carrier due to at least a predefined threshold number of UEs of a given class being connected with the access node on the carrier, the access node could then dynamically reconfigure itself to reduce the TTI bundling factor, i.e., to reduce the quantity of transmissions in each bundle. For instance, the access node could reconfigure itself from a default mode of operation in which the access node schedules TTI bundling with a bundling factor of four (e.g., an initial transmission and three automatic retransmissions) to a revised mode of operation in which the access node schedules TTI bundling with a bundling factor of three (e.g., an initial transmission and two automatic retransmissions).

Moreover, in this implementation, the access node could base the level of reduction of the TTI bundling factor and/or the resulting configured TTI bundling factor on the size of the resource reservation (e.g., the absolute or percentage number of PRBs proactively reserved per TTI or otherwise per unit time) that the access node proactively imposes and/or on one or more other factors. For instance, if the access node proactively imposes a relatively large resource reservation on the carrier, then the access node might responsively apply a larger TTI-bundle-size reduction, and if the access node proactively imposes a relatively small resource reservation on the carrier, then the access node might responsively apply a smaller TTI-bundle-size reduction.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

An example implementation will now be described in the context of a system operating according to 4G LTE or 5G NR by way of example. It should be understood, however, that the principles disclosed herein could extend to apply with respect to other RATs as well. Further, it should be understood that other variations from the specific arrangements and processes described are possible. For instance, various described entities, connections, functions, and other elements could be added, omitted, distributed, re-located, re-ordered, combined, or changed in other ways. In addition, it will be understood that technical operations disclosed as being carried out by one or more entities could be carried out at least in part by a processing unit programmed to carry out the operations or to cause one or more other entities to carry out the operations.

Figure 1:
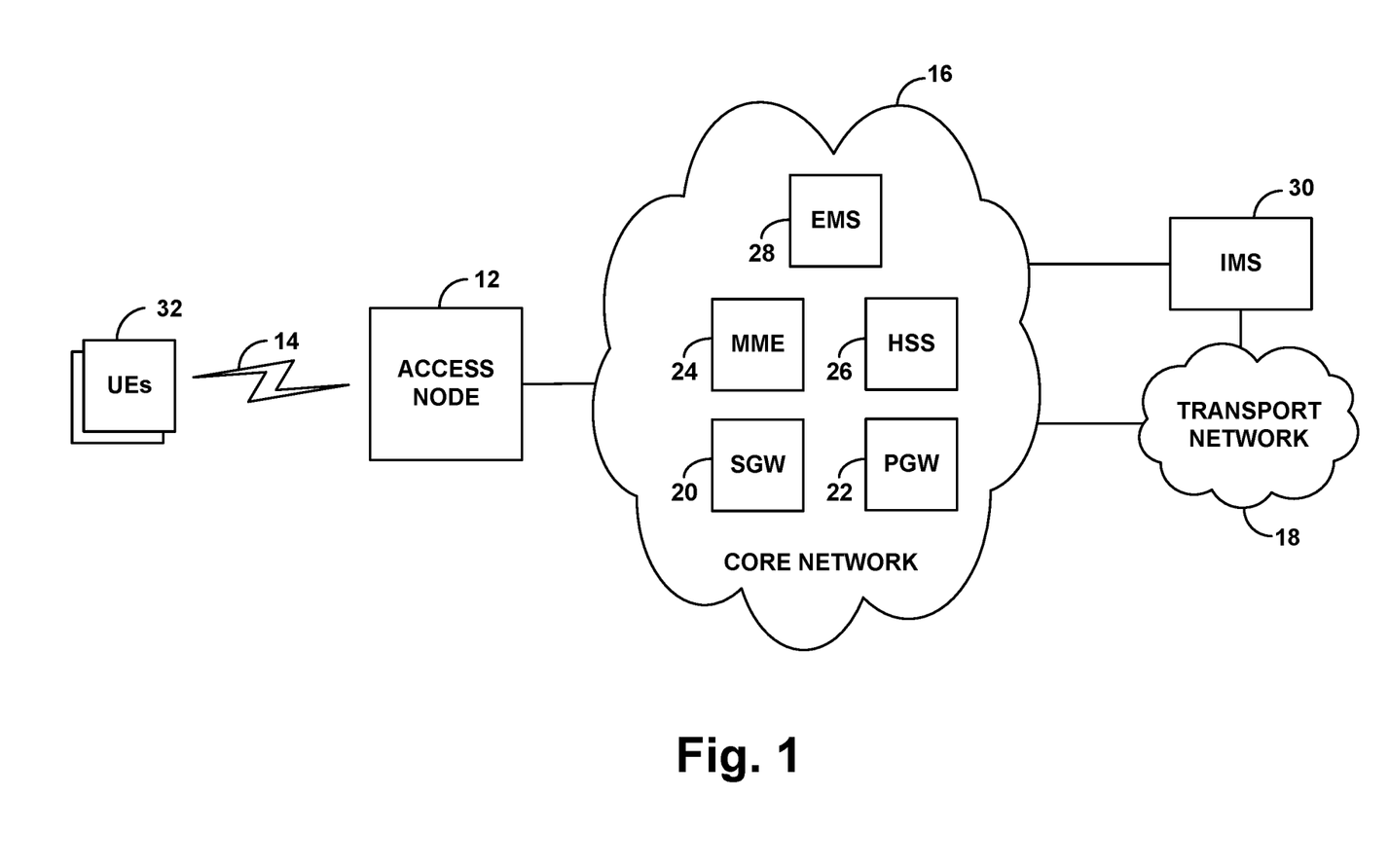
FIG. 1 is a simplified block diagram of an example network arrangement in which features of the present disclosure can be implemented.

Referring to the drawings, as noted above, FIG. 1 is a simplified block diagram of an example wireless communication system in which features of the present disclosure can be implemented. In particular, FIG. 1 depicts a representative network that functions primarily to serve UEs with wireless packet data communication service, including possibly voice-over-packet service, but may also provide other functions.

As shown, the network includes an example access node 12, which could be a 4G LTE access node (e.g., evolved Node-B (eNB)) or a 5G NR access node (e.g., next generation Node-B (gNB)), among other possibilities.

This access node could be a macro access node of the type configured to provide a wide range of coverage or could take other forms, such as a small cell access node, a relay node, a femtocell access node, or the like, possibly configured to provide a smaller range of coverage. Further, the access node could be configured to provide coverage on at least one carrier 14, which could be FDD or TDD as discussed above.

In an example implementation, the air interface on this carrier could be configured to define various air-interface resources for carrying communications between the access node and UEs.

By way of example, in the time domain, the air interface could define a continuum of 10-millisecond (ms) frames, each divided into ten 1-ms subframes as TTIs, and each TTI could be further divided into a number of timeslots, each additionally divided into symbol time segments. And in the frequency domain, the bandwidth of the carrier could be divided into subcarriers with specified subcarrier spacing on the order of 15 to 240 kHz. With this example arrangement, the air interface would define the array of resource elements as noted above, with each resource element spanning a respective symbol time segment and occupying a respective subcarrier, and the access node and UEs could communicate with each other through modulation of the subcarriers to carry data in those resource elements.

Further, particular sets of resource elements on the air interface could be grouped together to define the PRBs discussed above. In an example implementation, each PRB could span one timeslot in the time domain and a group of subcarriers in the frequency domain. Depending on the carrier bandwidth, the air interface could thus support a certain finite number of such PRBs across the bandwidth of the carrier within each TTI.

In addition, certain resource elements on the downlink and uplink of the example air interface could be designated for particular use as discussed above.

For instance, on the downlink, certain resource elements per TTI could define a downlink control region for carrying control signaling such as scheduling directives and HARQ messaging from the access node to UEs. And other resource elements per TTI could define a shared channel in which the access node could allocate PRBs on an as-needed basis to carry data communications from the access node to UEs. Further, resource elements distributed in a predefined pattern throughout the carrier bandwidth per TTI could carry a broadcast reference signal as noted above, which UEs could measure as a basis to evaluate coverage strength and quality and to provide channel estimates to facilitate precoding, beamforming, or the like.

In addition, in certain downlink subframes, a group of resource elements centered on the center frequency of the carrier in certain TTIs could carry the broadcast synchronization signals noted above, which UEs could detect as a way to discover coverage of the access node on the carrier and to establish frame timing. And in certain downlink subframes, a group of resource elements also centered on the center frequency of the carrier in certain TTIs could carry broadcast system information messages, such as a master information block (MIB) and system information block (SIB) messages that UEs could read to obtain operational parameters such as carrier bandwidth (e.g., downlink bandwidth and/or uplink bandwidth) and other information.

On the uplink, on the other hand, certain resource elements per TTI, such as sets of PRBs at the low-frequency end of the carrier and at the high-frequency end of the carrier, could define an uplink control region for carrying control signaling such as access requests, channel-quality reports, scheduling requests, and HARQ messaging, from UEs to the access node. And other resource elements per TTI could define a shared channel in which the access node could allocate PRBs on an as-needed basis to carry data communications from UEs to the access node. Further, still other resources on the uplink could be used for other purposes as well, such as to carry uplink reference signals or the like.

In the example of FIG. 1, the access node is shown interconnected with a core network 16 that provides connectivity with a transport network 18. The core network 16 could be a packet-switched network configured as an Evolved Packet Core (EPC) network or a Next Generation Core (NGC) core network, among other possibilities, with entities having Internet Protocol (IP) addresses and being configured to communicate with each other through virtual packet-tunnels or the like.

In an example EPC arrangement, as shown, the core network 16 includes a serving gateway (SGW) 20 and a packet-data-network gateway (PGW) 22, for carrying user-plane communications through the core network 16 between the access node 12 and the transport network 18. Further, the core network 16 includes a mobility management entity (MME) 24, which functions as a core-network controller, responsible for managing UE attachment and bearer setup, among other operations, and a home subscriber server (HSS) 26, which stores UE profile records and may specify service-subscription plans, UE device type and configuration, and/or other such UE profile information.

The example core network 16 is also shown including an element management system (EMS) 28, which could operate as a central repository of operational data for the wireless communication network and to control and manage operation of various network elements, to help ensure optimal use of their resources. In practice, entities such as the access node 12 could regularly report to the EMS 28 various operational data, such as data regarding connectivity and service of UEs, and data regarding access node load (e.g., PRB utilization) and performance, among others. And the EMS 28 could oversee operation of the access node 12 and other entities, providing operation directives or the like to which the entities could be configured to respond accordingly.

In addition, as further shown, the core network 16 and/or transport network 18 in the example arrangement could include or provide connectivity with an example Internet Multimedia Subsystem (IMS) 30. The IMS 30 could include various proxy servers and media servers configured to provide packet-based real-time media services, such as VoIP-call services for served UEs. For instance, to facilitate VoIP-call service, a UE served by access node 30 might engage in packet-based call-setup signaling, such as Session Initiation Protocol (SIP) signaling, with the IMS 30 to establish a packet-based real-time media session that extends between the UE and the IMS 30 via the access node 12 and the core network 16, and the IMS 30 might establish a connection with a remote call party and bridge that connection with the UE's packet-based real-time media session, so that the UE and remote party could then engage in voice-call communication.

For representative VoIP communication, voice could digitized and encoded using a codec that might encode and output voice frames of 20 milliseconds each or so. The encoded data could then be packetized and transmitted to the other end, where the data could be de-packetized, decoded, and played out. Thus, as a UE is engaged in a VoIP call, a sequence of voice packets could pass respectively in each direction to and from the UE, carrying voice communications respectively in each direction.

FIG. 1 depicts multiple example UEs 32 that may be within coverage of and connect with access node 12 from time to time. These UEs could be of various types, including for instance any of the types noted above, among other possibilities.

When each such UE initially enters into coverage of the system, the UE could discover threshold strong coverage of access node 12 and, as noted above, could then engage in random-access and connection signaling, to establish an RRC connection with the access node 12, thus putting the UE in an RRC connected mode. Further, the UE could engage in attach signaling through the access node 12 with the MME 24. And after authentication of the UE and/or at other times during service of the UE, the MME 24 could coordinate setup for the UE of one or more user-plane bearers each including a radio-access bearer (RAB) that has a data radio bearer (DRB) extending over the air between the access node 12 and the UE and an S1-U tunnel extending between the access node 12 and the SGW 20, and including an S5 tunnel extending between the SGW 20 and the PGW 22. In addition, the access node 12 could establish for the UE a context record, indicating the UE's connected state and identifying each such bearer configured for the UE, and could report the UE connection data to the EMS 28.

In relation to this attachment process or at another time, the access node 12 could also obtain configuration and capabilities data regarding the UE, such as data indicating the UE device type (e.g., whether the device is an IoT device or rather a consumer device such as a cell phone) and service subscription details (e.g., whether the device supports VoIP-call communication, etc.), and could store this data in the UE context record for reference while serving the UE. For instance, during the attachment process, the MME 24 could obtain this data from the HSS 26 and could covey the data to the access node 12 for storage, and/or the UE could provide the access node 12 with a report of this data. Further, the EMS 28 could also have access to this data regarding the UE, perhaps obtaining the data from the HSS 26 or access node 12, among other possibilities.

Each bearer that the MME 24 sets up for the UE could have a corresponding quality of service class indicator (QCI) level, which could indicate a class or type of communication that would be carried by the bearer, and which the access node 12 could note in its context record for the UE connection.

For instance, upon initial attachment, the MME might set up for the UE a best-efforts general Internet bearer (e.g., QCI 8 or 9) for use to carry general Internet communications. And if the UE is a particular type of device, such as an IoT device, the MME 24 might set up a bearer with a QCI level deemed appropriate for that type of UE (e.g., QCI 7). Further, if the UE subscribes to VoIP service, the MME 24 might set up for the UE an IMS-signaling bearer (e.g., QCI 5) for carrying SIP signaling between the UE and the IMS. And if and when a VoIP call is set up for the UE, the MME 24 might set up for the UE a dedicated VoIP bearer (e.g., QCI 1). Other examples are possible as well.

Once the UE is so connected with an access node 12 and attached, as noted above, the access node 12 could then serve the UE.

For instance, when the access node 12 receives data destined to the UE, the access node 12 could allocate downlink PRBs of an upcoming TTI to carry a block of that data to the UE and, in the downlink control region of that upcoming TTI could transmit to the UE a DCI message designating the allocated PRBs of that TTI. And the access node 12 could accordingly transmit the block of data to the UE in the allocated PRBs of that TTI. The UE might then determine if the UE successfully receives the scheduled transmission (e.g., based on a CRC analysis) and, as noted above, then transmit to the access node 12 either an ACK, which would signal successful completion of the transmission, or a NACK, which may cause the access node 12 to engage in retransmission.

Alternatively, the access node 12 could apply TTI bundling for this downlink transmission to the UE. For instance, the access node could allocate downlink PRBs of each of a series of upcoming TTIs to carry respective transmissions of the block of data to the UE, perhaps each with different error-correction coding, and the access node could transmit to the UE a DCI message that designates the TTI bundling factor and allocated PRBs per TTI. The access node 12 could then accordingly engage in the multiple transmissions to the UE. And based on whether the UE successfully receives the block of data through these multiple transmissions from the access node, the UE could then transmit to the access node 12 either an ACK or NACK.

Likewise, when the UE has data to transmit, UE could send a scheduling request to the access node, the access node could allocate uplink PRBs of an upcoming TTI to carry a block of the data from UE and could transmit to the UE a DCI message designating the allocated PRBs of the upcoming TTI, and the UE could accordingly transmit the block of data to the access node 12 in the allocated PRBs of that TTI. The access node 12 might then determine if the access node successfully receives the scheduled transmission (e.g., based on a CRC analysis) and, as noted above, then transmit to the UE either an ACK, which would signal successful completion of the transmission, or a NACK, which may cause the UE to engage in retransmission.

Alternatively, for this uplink transmission from the UE, the access node 12 might similarly apply TTI bundling. For instance, the access node could allocate uplink PRBs of each of a series of upcoming TTIs to carry respective transmissions of the block of data from the UE, perhaps each with different error-correction coding, and access node could transmit to the UE a DCI message that designates the TTI bundling factor and allocated PRBs per TTI. The UE could then accordingly engage in the multiple transmissions to the access node 12. And based on whether the access node 12 successfully receives the block of data through these multiple transmissions from the UE, the access node 12 could then transmit to the UE either an ACK or NACK.

In an example implementation, the access node 12 could have a default configuration and thus default mode of operation in which the access node 12 is configured to apply TTI bundling for a given communication based on the communication type, among other possible factors. For instance, the access node 12 could be provisioned with data that specifies various communication types as to which the access node 12 is to automatically apply TTI bundling and/or various types of communications as to which the access node 12 is to not apply TTI bundling.

Example communication types as to which the access node 12 could be so configured to apply TTI bundling might include VoIP communication and other latency-sensitive communications. Whereas, example communication types as to which the access node could be so configured to not apply TTI bundling might include best-efforts communications such as general Internet communications for instance.

With this default configuration, if and when the access node 12 is serving a VoIP communication (e.g., as indicated by the communication being on a QCI-1 bearer or when deep packet inspection or other analysis so indicates), the access node 12 could automatically apply TTI bundling to the communication. Whereas, if and when the access node 12 is serving a best-efforts communication (e.g., as indicated by the communication being on a QCI-9 bearer or when deep packet inspection or other analysis so indicates), the access node 12 could automatically not apply TTI bundling to the communication.

As further indicated, the access node 12 could also be configured to proactively reserve some of the PRBs of carrier 14 in response to the access node 12 detecting that at least a predefined threshold high number of UEs of a particular type are RRC connected with access node 12. This could be on the downlink and/or the uplink.

For instance, the access node 12 might be configured to proactively reserve some of the PRBs of the carrier 14 for use to serve Cat-M1 IoT devices in response to the access node 12 determining that at least a predefined threshold high number of Cat-M1 IoT devices are currently RRC-connected with the access node 12. This predefined threshold high number could be set by engineering design and/or business policy to be a number where it would be important or useful to help ensure that there will be sufficient PRB availability for use to serve such devices. Further, the threshold could be predefined to vary per time of day and/or based on consideration of one or more other factors, such as load (e.g., PRB utilization) on the carrier, among other possibilities. And the device type at issue could be a particular class of devices that is defined in advance to be at issue.

As an example implementation of this process, assume that carrier 14 defines 100 PRBs per TTI. In a default mode of operation, the access node 12 might not have a portion of those PRBs proactively reserved for use to carry communications with Cat-M1 devices.

Upon determining that the number of Cat-M1 devices currently RRC-connected with the access node 12 has risen to the predefined threshold number, the access node 12 could then reconfigure itself from the default mode of operation to a mode of operation in which the access node 12 has a portion of the PRBs proactively reserved for use to carry communications with Cat-M1 devices. For instance, the access node 12 might designate 8 PRBs per TTI as PRBs reserved for use to carry communications with the Cat-M1 device and may record this proactive resource reservation in its internal memory or other data storage for reference when it later becomes necessary to schedule communications with the connected Cat-M1 devices. With this proactive resource reservation, the access node 12 may then more likely and readily schedule communications with Cat-M1 devices when necessary.

As noted above, however, this proactive resource reservation could also contribute to reduced PRB availability for other UEs served by the access node 12.

In line with the discussion above, to help address this issue, when the access node 12 proactively imposes this or another such resource reservation on the carrier, the access node 12 could responsively also reconfigure itself to reduce the access node's application of TTI bundling on the carrier.

For instance, the access node 12 could responsively reconfigure itself from (i) a default mode of operation where the access node 12 would automatically apply TTI bundling in response to particular TTI-bundling triggers such as communication type to (ii) a revised mode of operation in which the access node 12 would not apply TTI bundling in response to such triggers. Or the access node 12 could responsively reconfigure itself from (i) a default mode of operation in which, when the access node 12 applies TTI bundling, the access node would apply the TTI bundling with a first TTI-bundling factor to (ii) a revised mode of operation in which, when the access node 12 applies TTI bundling, the access node 12 would apply the TTI bundling with a second TTI-bundling factor that defines a smaller bundle, with less automatic repeat transmission, than the first TTI-bundling factor.

In an example implementation, the access node 12 could so reconfigure itself by setting a flag or other configuration setting in its internal memory or other data storage specifying the reconfigured state of operation. For instance, the access node 12 might normally have a stored setting indicating that the access node 12 is to apply TTI bundling when the communication type at issue is VoIP communication. But in response to the access node 12 proactively imposing a PRB reservation for Cat-M1 devices in view of the access node 12 having at least a threshold high number of RRC-connected Cat-M1 devices, the access node 12 could clear that stored setting or change the stored setting to no longer indicate that the access node 12 is to apply TTI bundling when the communication type at issue is VoIP communication In accordance with the default setting, the access node 12 would thus apply TTI bundling when the communication type at issue is VoIP communication. But then in accordance with the revised setting, the access node 12 would not apply TTI bundling when the communication type at issue is VoIP communication.

Similar processing could apply to cause a reduction in TTI-bundling factor rather than disabling TTI bundling. And as noted above, the access node 12 could base the extent of its reduction in TTI-bundling factor on various considerations. For instance, the access node 12 could base the extent of its reduction in TTI-bundling factor on the size of its proactive PRB reservation. In addition or alternatively, the access node 12 could base the extent of its reduction in TTI-bundling factor on an evaluation of load, such as PRB-utilization (e.g., percentage of PRBs allocated per unit time) on the carrier 14, perhaps reducing the TTI-bundling factor more when the carrier is more highly loaded and less when the carrier is less highly loaded.

When the access node imposes such a reduction in application of TTI bundling in response to the access node proactively imposing the resource reservation due to having a threshold high number of connected UEs of a particular class, the access node 12 could impose the reduction in application of TTI bundling generally for all UEs served by the access node 12 or just for specific UEs or in specific situations. For example, the access node could impose the reduction in TTI bundling for UEs of a relatively low service-level class and/or only when carrier 14 has at least a predefined high level of load, among other possibilities.

Further, as noted above, when the access node 12 has applied this reduction in its application of TTI bundling, the access node 12 could keep the reduction in place temporarily and could automatically revert to its default mode of operation in response to one or more reversion triggers. For example, the access node 12 could automatically revert to its default mode of operation when the number of RRC-connected devices of the class at issue drops to below (e.g., sufficiently below) the predefined threshold level, as a result of UEs transitioning to RRC-idle mode or otherwise disconnecting from the access node 12, among other possibilities.

Note also that, while various operations have been described so far as being carried out by the access node 12, various such operations could be coordinated and/or carried out by one or more other entities. By way of example, in the arrangement of FIG. 1, the EMS 28 might coordinate the disclosed process. For instance, the EMS 28 might learn, from reports from access node 12 or the like, when the access node has at least the predefined threshold high number of RRC-connected UEs of the class at issue, and the EMS 28 might responsively transmit to the access node 12 a signaling message to which the access node 12 is configured to respond by proactively imposing an associated PRB reservation and, per the present disclosure, therefore also transitioning to reduce the extent of TTI-bundling that the access node is configured to apply.

Figure 2:
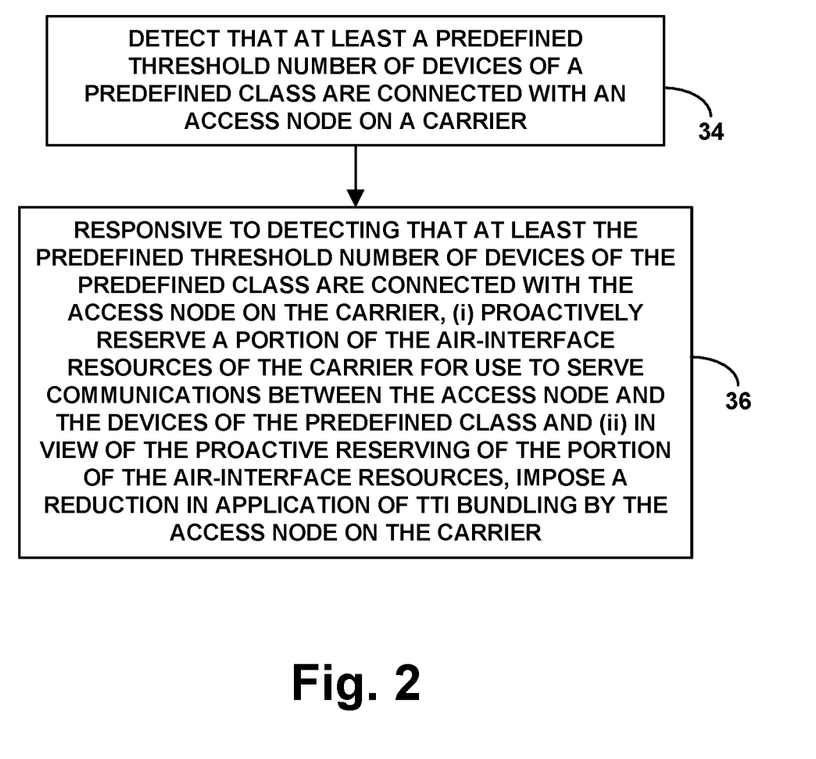
FIG. 2 is a flow chart depicting an example method in accordance with the present disclosure.

FIG. 2 is a flow chart depicting a method that could be carried out in accordance with the present disclosure, to control application of TTI bundling on an RF carrier on which an access node provides wireless communication service, where the carrier defines air-interface resources (e.g., PRBs), and where the access node supports application of TTI bundling on the carrier. For instance, the access node could be access node 12 as described above, configured by default to apply TTI bundling for certain types of communications. And the method could be carried out by the access node and/or carried out or otherwise coordinated by an external computing system such as the EMS 28 discussed above.

As shown in FIG. 2, at block 34, the method includes detecting that at least a predefined threshold number of devices of a predefined class are connected with the access node on the carrier. And at block 36, the method includes, responsive to the detecting that at least the predefined threshold number of devices of the predefined class are connected with the access node on the carrier, (i) proactively reserving a portion of the air-interface resources for use to serve communications between the access node and the devices of the predefined class and (ii) in view of (e.g., in response to) the proactive reserving of the portion of the air-interface resources, imposing a reduction in the application of the TTI bundling by the access node on the carrier.

In line with the discussion above, the predefined class of devices could be IoT devices or a particular type of IoT devices, among other possibilities.

In line with the discussion above, the reduction in the application of the TTI bundling by the access node could additionally be based on a determination that the carrier has at least a predefined threshold high level of load. For instance, the access node could impose the reduction in the application of the TTI bundling in view of the proactive resource reservation being made and there being at least a predefined threshold high level of PRB utilization on the carrier.

Further, as discussed above, the imposing of the reduction in the application of the TTI bundling by the access node could take various forms.

For instance, it could involve reconfiguring the access node from (i) a first mode in which the access node is configured to apply the TTI bundling in response to a TTI-bundling trigger (e.g., the communication at issue being VoIP communication) to (ii) a second mode in which the access node is not configured to apply TTI bundling in response to the TTI-bundling trigger.

Alternatively or additionally, it could involve reconfiguring the access node from (i) a first mode in which, when the access node applies TTI bundling, the access node applies the TTI bundling with a first bundling factor defining a first quantity of repeated transmissions per block of data to (ii) a second mode in which, when the access node applies TTI bundling, the access node applies the TTI bundling with a second bundling factor that defines a second quantity of repeated transmissions per block of data, the second quantity being less than the first quantity. And in this case, the method could also include setting an extent of the reduction based on a size of the portion of the air-interfaces proactively reserved.

Still further, as discussed above, the method could additionally include, responsive to a reversion trigger, undoing the imposed reduction in the application of the TTI bundling. And the reversion trigger could include detecting that fewer than the predefined threshold number of devices of the predefined class are connected with the access node on the carrier.

Figure 3:
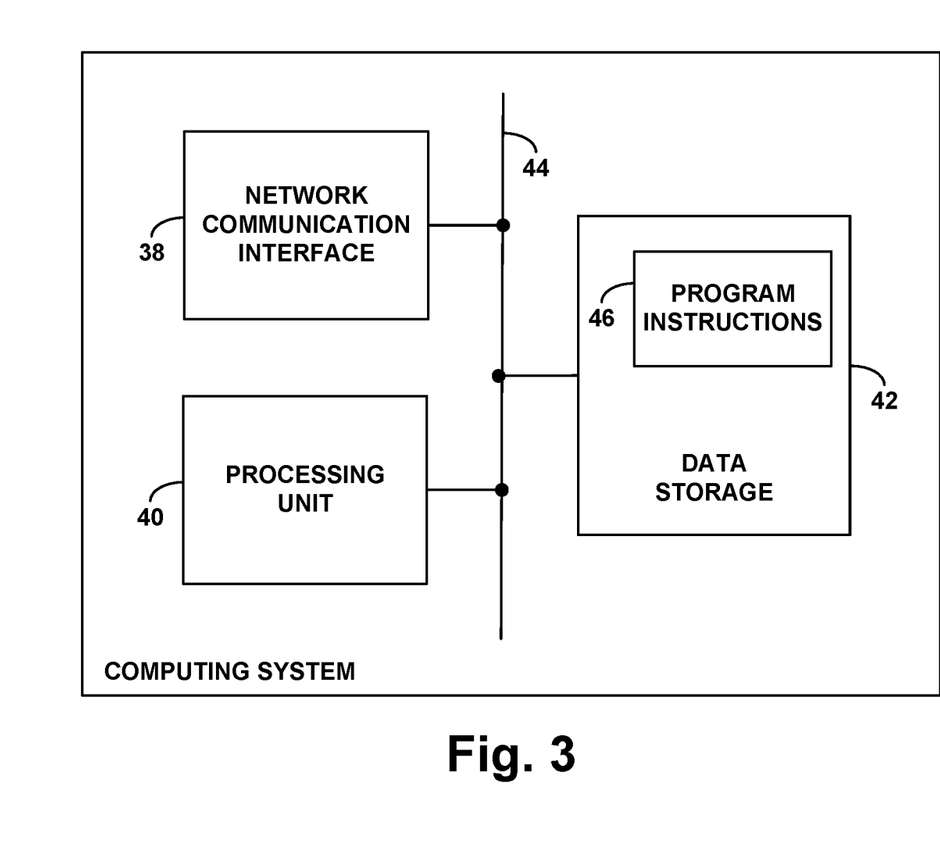
FIG. 3 is a simplified block diagram of an example computing system operable in accordance with the present disclosure.

FIG. 3 is next a simplified block diagram of an example computing system that could carry out various features as described above, to control application of TT bundling on an RF carrier on which an access node provides wireless communication service, where the carrier defines air-interface resources, and where the access node supports application of TTI bundling on the carrier. As noted above, this computing system could be the EMS 28, among other possibilities.

As shown in FIG. 3, the example computing system includes a network communication interface 38, a processing unit 40, and non-transitory data storage 42, which could be integrated or communicatively linked together by a system bus, network, or other connection mechanism 44.

The network communication interface 38 could comprise a wired or wireless network communication module, such as an Ethernet interface, through which the computing system can communicate with other entities. And the processing unit 40 could comprise one or more processors, such as one or more general purpose processors (e.g., microprocessors) and/or specialized processors (e.g., application specific integrated circuits).

Further, the non-transitory data storage 42 could comprise one or more volatile and/or non-volatile storage components, such as magnetic, optical, or flash storage media. And as shown, the data storage 42 could hold, store, encode, or otherwise embody program instructions 46. In a representative implementation, those program instructions 46 could be executable by the processing unit 40 to carry out various features described herein such as those described with respect to FIG. 2 for instance.

Figure 4:
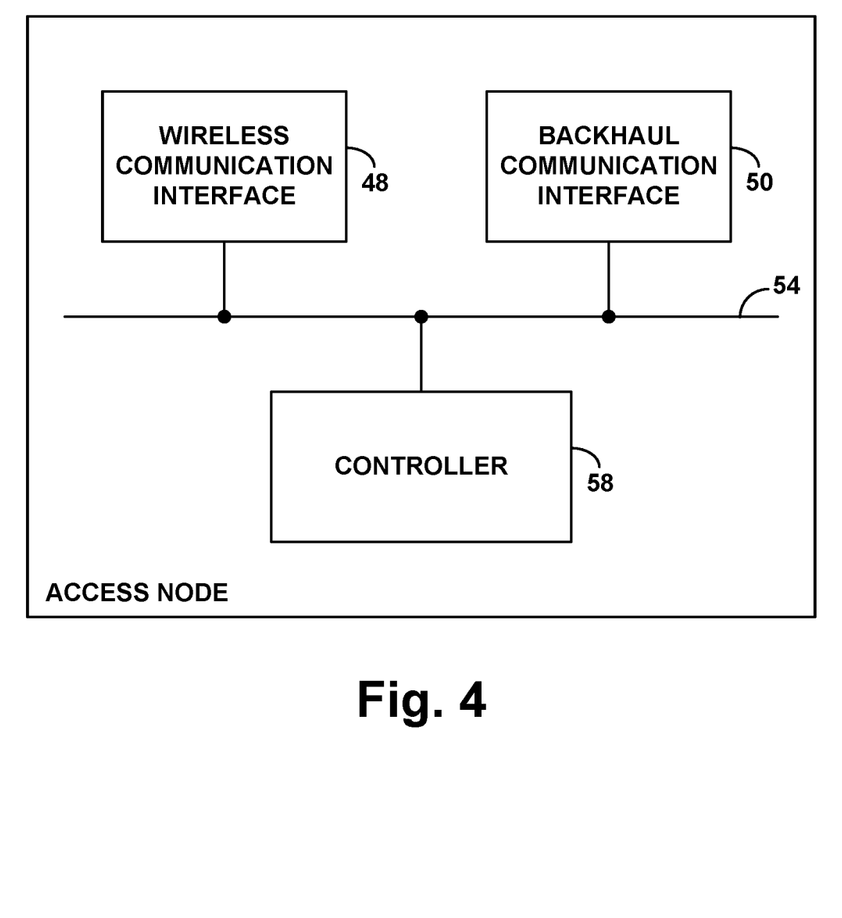
FIG. 4 is a simplified block diagram of an example access node operable in accordance with the present disclosure.

Finally, FIG. 4 is a simplified block diagram of an example access node, such as access node 12 discussed above for instance, operable in accordance with the present disclosure to control application of TTI bundling on an RF carrier on which the access node provides wireless communication service, where the carrier defines air-interface resources, and where the access node supports application of TTI bundling on the carrier.

As shown, the example access node includes a wireless communication interface 48, a backhaul communication interface 50, and a controller 52, which could be integrated together in various ways and/or interconnected by a system bus, network, or other communication mechanism 54 as shown.

The wireless communication interface 48 could include a radio and antenna structure through which the first access node could be configured to communicate with and serve UEs on the carrier. And the backhaul communication interface 50 could comprise a wired or wireless network communication module, such as an Ethernet interface, through which to communicate with other entities, such as entities on or via a core network.

Further, the controller 52 could comprise a processing unit (e.g., one or more processing units such as microprocessors and/or specialized processors), non-transitory data storage (e.g., one or more volatile and/or non-volatile storage components, such as magnetic, optical, or flash storage), and program instructions stored in the data storage and executable by the processing unit to carry out (e.g., cause the access node to carry out) various operations as described herein.

Various features discussed above can be implemented in this context as well, and vice versa.

Further, the present disclosure contemplates a computer-readable medium encoded with, storing, or otherwise embodying program instructions executable by a processing unit to carry out various operations described herein.

Exemplary embodiments have been described above. Those skilled in the art will understand, however, that changes and modifications may be made to these embodiments without departing from the true scope and spirit of the invention.

We claim:

1. A method for controlling application of transmission time interval (TTI) bundling on a radio-frequency (RF) carrier on which an access node provides wireless communication service, wherein the carrier defines air-interface resources, and wherein the access node supports application of TTI bundling on the carrier, the method comprising:
   detecting that at least a predefined threshold number of devices of a predefined class are connected with the access node on the carrier; and
   responsive to the detecting that at least the predefined threshold number of devices of the predefined class are connected with the access node on the carrier, (i) proactively reserving a portion of the air-interface resources for use to serve communications between the access node and the devices of the predefined class and (ii) imposing a reduction in the application of the TTI bundling by the access node on the carrier.

2. The method of claim 1, wherein the method is carried out by the access node.

3. The method of claim 1, wherein the method is coordinated by a computing system that is in network communication with the access node.

4. The method of claim 1, wherein the devices of the predefined class are Internet-of-Things (IoT) devices.

5. The method of claim 1, wherein the reduction in the application of the TTI bundling by the access node is additionally based on a determination that the carrier has at least a predefined threshold high level of load.

6. The method of claim 1, wherein imposing the reduction in the application of the TTI bundling by the access node comprises reconfiguring the access node from (i) a first mode in which the access node is configured to apply the TTI bundling in response to a TTI-bundling trigger to (ii) a second mode in which the access node is not configured to apply TTI bundling in response to the TTI-bundling trigger.

7. The method of claim 1, wherein imposing the reduction in the application of the TTI bundling by the access node comprises reconfiguring the access node from (i) a first mode in which the access node is configured to apply the TTI bundling to voice over Internet Protocol (VoIP) communication to (ii) a second mode in which the access node is not configured to apply TTI bundling to VoIP communication.

8. The method of claim 1, wherein imposing the reduction in the application of TTI bundling by the access node comprises reconfiguring the access node from (i) a first mode in which, when the access node applies TTI bundling, the access node applies the TTI bundling with a first bundling factor defining a first quantity of repeated transmissions per block of data to (ii) a second mode in which, when the access node applies TTI bundling, the access node applies the TTI bundling with a second bundling factor that defines a second quantity of repeated transmissions per block of data, the second quantity being less than the first quantity.

9. The method of claim 8, further comprising setting an extent of the reduction based on a size of the portion of the air-interfaces proactively reserved.

10. The method of claim 1, further comprising, responsive to a reversion trigger, undoing the imposed reduction in the application of the TTI bundling.

11. The method of claim 1, wherein the reversion trigger comprises detecting that fewer than the predefined threshold number of devices of the predefined class are connected with the access node on the carrier.

12. A computing system operable to control application of transmission time interval (TTI) bundling on a radio-frequency (RF) carrier on which an access node provides wireless communication service, wherein the carrier defines air-interface resources, and wherein the access node supports application of TTI bundling on the carrier, the computing system comprising:
   a network communication interface;
   a one processing unit;
   non-transitory data storage; and
   program instructions stored in the non-transitory data storage and executable by the processing unit to carry out operations including:
      detecting that at least a predefined threshold number of devices of a predefined class are connected with the access node on the carrier, and
      responsive to the detecting that at least the predefined threshold number of devices of a predefined class are connected with the access node on the carrier, causing the access node (i) to proactively reserve a portion of the air-interface resources for use to serve communications between the access node and the devices of the predefined class and (ii) to impose a reduction in the application of the TTI bundling by the access node on the carrier.

13. An access node operable to control application of transmission time interval (TTI) bundling on a radio-frequency (RF) carrier on which the access node provides wireless communication service, wherein the carrier defines air-interface resources, and wherein the access node supports application of TTI bundling on the carrier, the access node comprising:
   a wireless communication interface including an antenna structure through which the access node is configured to communicate on the carrier; and
   a controller configured to carry out operations to control the application of the TTI bundling on the carrier,
   wherein the operations include detecting that at least a predefined threshold number of devices of a predefined class are connected with the access node on the carrier, and
   wherein the operations include, responsive to the detecting that at least the predefined threshold number of devices of the predefined class are connected with the access node on the carrier, (i) proactively reserving a portion of the air-interface resources for use to serve communications between the access node and the devices of the predefined class and (ii) imposing a reduction in the application of the TTI bundling by the access node on the carrier.

14. The access node of claim 13, wherein the controller comprises a processing unit, non-transitory data storage, and program instructions stored in non-transitory data storage and executable by the processing unit to carry out the operations.

15. The access node of claim 13, wherein the reduction in the application of the TTI bundling by the access node is additionally based on a determination that the carrier has at least a predefined threshold high level of load.

16. The access node of claim 13, wherein imposing the reduction in the application of the TTI bundling by the access node comprises reconfiguring the access node from (i) a first mode in which the access node is configured to apply the TTI bundling in response to a TTI-bundling trigger to (ii) a second mode in which the access node is not configured to apply TTI bundling in response to the TTI-bundling trigger.

17. The access node of claim 13, wherein imposing the reduction in the application of TTI bundling by the access node comprises reconfiguring the access node from (i) a first mode in which, when the access node applies TTI bundling, the access node applies the TTI bundling with a first bundling factor defining a first quantity of repeated transmissions per block of data to (ii) a second mode in which, when the access node applies TTI bundling, the access node applies the TTI bundling with a second bundling factor that defines a second quantity of repeated transmissions per block of data, the second quantity being less than the first quantity.

18. The access node of claim 17, wherein the operations further include setting an extent of the reduction based on a size of the portion of the air-interfaces proactively reserved.

19. The access node of claim 13, wherein the operations further include, responsive to a reversion trigger, undoing the imposed reduction in the application of the TTI bundling.

20. The access node of claim 13, wherein the devices of the predefined class are Internet-of-Things (IoT) devices.

* * * * *